United States Patent
Akai et al.

(10) Patent No.: US 9,381,609 B2
(45) Date of Patent: Jul. 5, 2016

(54) CHIP DISCHARGING DEVICE OF MACHINE TOOL AND MACHINE TOOL EQUIPPED WITH THE SAME

(71) Applicant: DMG MORI SEIKI CO., LTD., Nara (JP)

(72) Inventors: Takayuki Akai, Nara (JP); Yoshihiro Matsumoto, Nara (JP); Masashi Yokoyama, Nara (JP); Toshiaki Tanaka, Nara (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 14/673,016

(22) Filed: Mar. 30, 2015

(65) Prior Publication Data
US 2015/0273642 A1    Oct. 1, 2015

(30) Foreign Application Priority Data

Mar. 31, 2014  (JP) .................................. 2014-072999

(51) Int. Cl.
*B23Q 11/00* (2006.01)
*B23Q 1/01* (2006.01)
*B23B 25/00* (2006.01)
*B30B 9/30* (2006.01)

(52) U.S. Cl.
CPC ............ *B23Q 11/0042* (2013.01); *B23B 25/00* (2013.01); *B23Q 1/015* (2013.01); *B23Q 11/0053* (2013.01); *B23Q 11/0067* (2013.01); *B23B 2270/30* (2013.01); *Y02P 70/171* (2015.11); *Y10T 82/2572* (2015.01)

(58) Field of Classification Search
CPC ........... B23Q 11/0042; B23Q 11/0053; B23Q 11/0067; B23Q 11/0075
See application file for complete search history.

(56) References Cited

U.S. PATENT DOCUMENTS

| | | | | |
|---|---|---|---|---|
| 3,850,814 A | * | 11/1974 | Dudley ..................... | B04B 7/04 209/13 |
| 4,310,417 A | * | 1/1982 | Dudley ..................... | B04B 3/00 210/375 |
| 6,257,811 B1 | * | 7/2001 | Schweizer ........... | B23Q 1/0009 29/27 C |
| 6,272,981 B1 | * | 8/2001 | Murata ................... | B30B 9/237 100/218 |
| 6,375,841 B1 | * | 4/2002 | Nemedi ..................... | B04B 3/00 209/12.1 |

(Continued)

FOREIGN PATENT DOCUMENTS

JP        61-031642 A       2/1986

OTHER PUBLICATIONS

English Abstract for JP61-031642, Publication Date: Feb. 14, 1986.

*Primary Examiner* — Will Fridie, Jr.

(57) ABSTRACT

A chip discharging device of a machine tool is equipped with a chip discharging member for discharging chips generated by machine processing to a workpiece to an outside of the machine tool, and a chip shooter for introducing the chips to the chip discharging member. The chip shooter connects an introducing opening for introducing the generated chips and a discharging opening for discharging the chips toward the chip discharging member by a guide wall surface. The guide wall surface includes a vertical wall surface and a plurality of inclined wall surfaces inclined with respect to the vertical wall surface. At least a boundary parts between the inclined wall surfaces and a boundary part between the inclined wall surface and the vertical wall surface are formed by a flat surface or a curved surface.

10 Claims, 11 Drawing Sheets

(56) References Cited

U.S. PATENT DOCUMENTS

| | | | |
|---|---|---|---|
| 6,387,026 B1* | 5/2002 | Schweizer | B23Q 1/4885 408/234 |
| 2006/0056931 A1* | 3/2006 | Schweizer | B23Q 1/015 409/137 |
| 2006/0207397 A1* | 9/2006 | Hiramoto | B23B 3/06 82/117 |
| 2010/0252542 A1* | 10/2010 | Zeygerman | B08B 15/04 219/121.67 |
| 2012/0076601 A1* | 3/2012 | Suyama | B23Q 1/525 409/137 |

\* cited by examiner

CHIP DISCHARGING DEVICE OF MACHINE TOOL AND MACHINE TOOL EQUIPPED WITH THE SAME

CROSS-REFERENCE TO RELATED APPLICATIONS

The present application claims priority under 35 U.S.C. 119 to Japanese Patent Application No. 2014-072999, filed on Mar. 31, 2014, the content of which is incorporated herein by reference in its entirety.

BACKGROUND OF THE INVENTION

1. Field of the Invention

The present disclosure relates to a chip discharging device for discharging chips generated by machine processing of a workpiece to an outside of a machine tool, and also relates to a machine tool equipped with the chip discharging device. More specifically, the present disclosure relates to a chip shooter structure for guiding chips to a chip collecting box or a chip conveyer, and also relates to a machine tool equipped with the chip shooter structure.

2. Description of the Related Art

The following description of related art sets forth the inventors' knowledge of related art and certain problems therein and should not be construed as an admission of knowledge in the prior art.

As a chip discharging device of this kind, conventionally, there exists a chip discharging device as disclosed in, for example, Japanese Unexamined Utility Model Application Publication No. 61-31642. This chip discharging device is provided with an enclosing member formed by combining a plurality of flat plates, and a chip discharging gutter having a U-shaped cross-sectional groove with angular corners and arranged below the enclosing member.

The aforementioned conventional chip discharging device is constituted by the enclosing member formed by combining the plurality of flat plates and the gutter having a U-shaped cross-sectional groove with angular corners. Therefore, there inevitably exist many corners, causing such problems that chips are easily accumulated in the corners and it takes time to clean up the chips accumulated in the corners.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The embodiments of the present invention have been made in view of the above conventional circumstances, and aim to provide a chip discharging device of a machine tool and a machine tool equipped with the chip discharging device in which chips are not readily accumulated and therefore the cleaning time can be shortened.

According to a first aspect of the present invention, in some embodiments, a chip discharging device of a machine tool includes a chip discharging member configured to discharge chips generated by machine processing of a workpiece to an outside of the machine tool, and a chip shooter configured to introduce the chips to the chip discharging member. The chip shooter includes an introducing opening for introducing the generated chips, a discharging opening for discharging the chips toward the chip discharging member, and a guide wall surface connecting the introducing opening and the discharging opening. The guide wall surface includes a vertical wall surface and a plurality of inclined wall surfaces inclined with respect to the vertical wall surface. At least a boundary part between the inclined wall surfaces and a boundary part between the inclined wall surface and the vertical wall surface are formed by a flat surface or a curved surface.

In some embodiments of the present invention, in the chip discharging device of the machine tool as recited above, the chip discharging device further includes a shooter mounting portion formed in a bed of the machine tool, the shooter mounting portion being configured to mount the chip shooter below a workpiece processing part. The chip shooter is mounted in the shooter mounting portion by inserting from an outside of the bed toward a center side of the machine, and is fixed in the shooter mounting portion.

In some embodiments of the present invention, in the chip discharging device as recited above, the shooter mounting portion of the bed is provided with a locking seat, and the chip shooter is provided with a locking piece formed on an outer surface of the chip shooter. And, the chip shooter is mounted in the shooter mounting portion by engaging the locking piece with the locking seat.

In some embodiments of the present invention, in the chip discharging device of the machine tool as recited above, the machine tool includes workpiece processing parts is arranged on left and right sides with respect to a center of the machine, and left and right shooter mounting portions is arranged below each of the workpiece processing parts. And, the chip shooter is structured so as to be mounted in either of the left and right shooter mounting portions.

According to a second aspect of the present invention, in some embodiments, a machine tool includes a chip discharging member configured to discharge chips generated by machine processing of a workpiece to an outside of the machine tool, and a chip shooter configured to introduce the chips to the chip discharging member. The chip shooter includes an introducing opening for introducing the generated chips, a discharging opening for discharging the chips toward the chip discharging member, and a guide wall surface connecting the introducing opening and the discharging opening. The guide wall surface includes a vertical wall surface and a plurality of inclined wall surfaces inclined with respect to the vertical wall surface. At least a boundary part between the inclined wall surfaces and a boundary part between the inclined wall surface and the vertical wall surface are formed by a flat surface or a curved surface.

According to some embodiments as recited above, the guide wall surface of the chip shooter includes the inclined wall surface inclined with respect to the vertical wall surface, and at least the boundary part between the inclined wall surfaces and the boundary part between the inclined wall surface and the vertical wall surface are connected by a flat surface or a curved surface. That is, the connection between the inclined wall surfaces or the connection between the inclined wall surface and the vertical wall surface do not form a corner part where chips are easily accumulated. In other words, the adjacent wall surfaces are not formed in an angular bent shape. Therefore, this structure can avoid such problem that chips are accumulated in a corner part or a bent part.

Regarding the boundary part of the vertical wall surfaces, even though there is a corner part or a bent part, chips are fallen by its own weight and does not get stuck in the corner part or the bent part. Therefore, it is not required that the boundary of the vertical wall surfaces is connected by a flat surface or a curved surface. However, even in the case of the boundary part of the vertical surfaces, it is preferable to be formed by a flat surface or a curved surface because it is assuredly prevented chips from getting stuck.

According to some embodiments as recited above, the shooter mounting portion is formed below the workpiece processing part in the bed of the machine tool, and the chip shooter is mounted in the shooter mounting portion from the outside of the bed toward the center side of the machine and is fixed in the shooter mounting portion. Therefore, even when the tool mount is arranged on the operator side of the bed, the mounting and removing operations of the chip shooter can be assuredly facilitated.

According to some embodiments as recited above, it is configured such that the locking seat is formed on the shooter mounting portion of the bed, the locking piece is formed on the outer surface of the chip shooter, and the locking piece is engaged with the locking seat. Therefore, the mounting and the removing operations of the chip shooter can be further facilitated.

According to some embodiments as recited above, the same shape of the chip shooter can be mounted in any of the left and right shooter mounting portions by rotating by 180 degrees. Therefore, the same shape of the chip shooters can be employed, and the cost of molding can be reduced when forming the chip shooter by molding.

According to some embodiments of the machine tool equipped with the chip discharging member, the same functions and effects as mentioned above can be exerted.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, embodiments of the present invention will be described with reference to the attached drawings.

Embodiment 1

FIGS. 1 to 11 are views for explaining a chip discharging device of a lathe according to Embodiment 1 of the present invention. In this Embodiment, "front and back" respectively refers to a closer side and a farther side when seen from an operator M positioned at the front side of the machine, and "left and right" respectively refer to the left and the right side when seen from the operator M.

Figure 1:
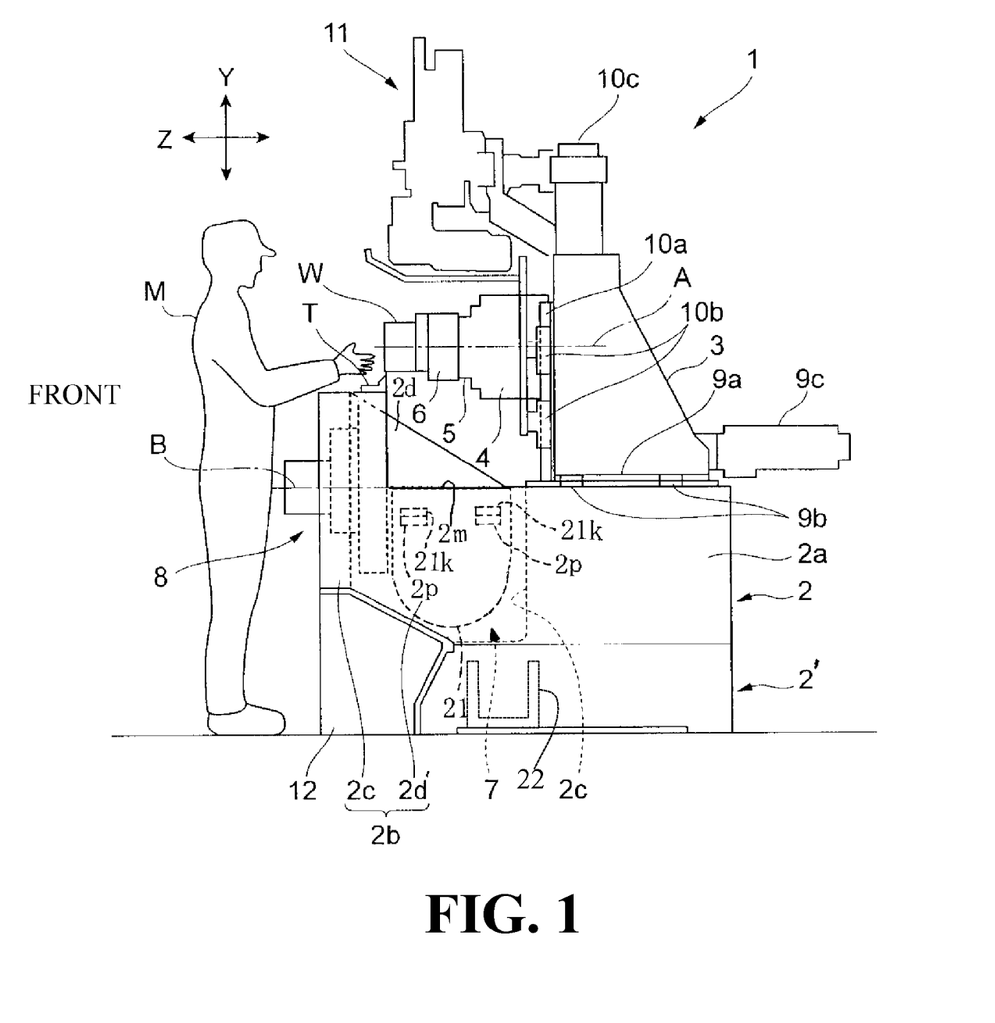
FIG. 1 is a right side view of a lathe provided with a chip shooter according to Embodiment 1 of the present invention.
Figure 2:
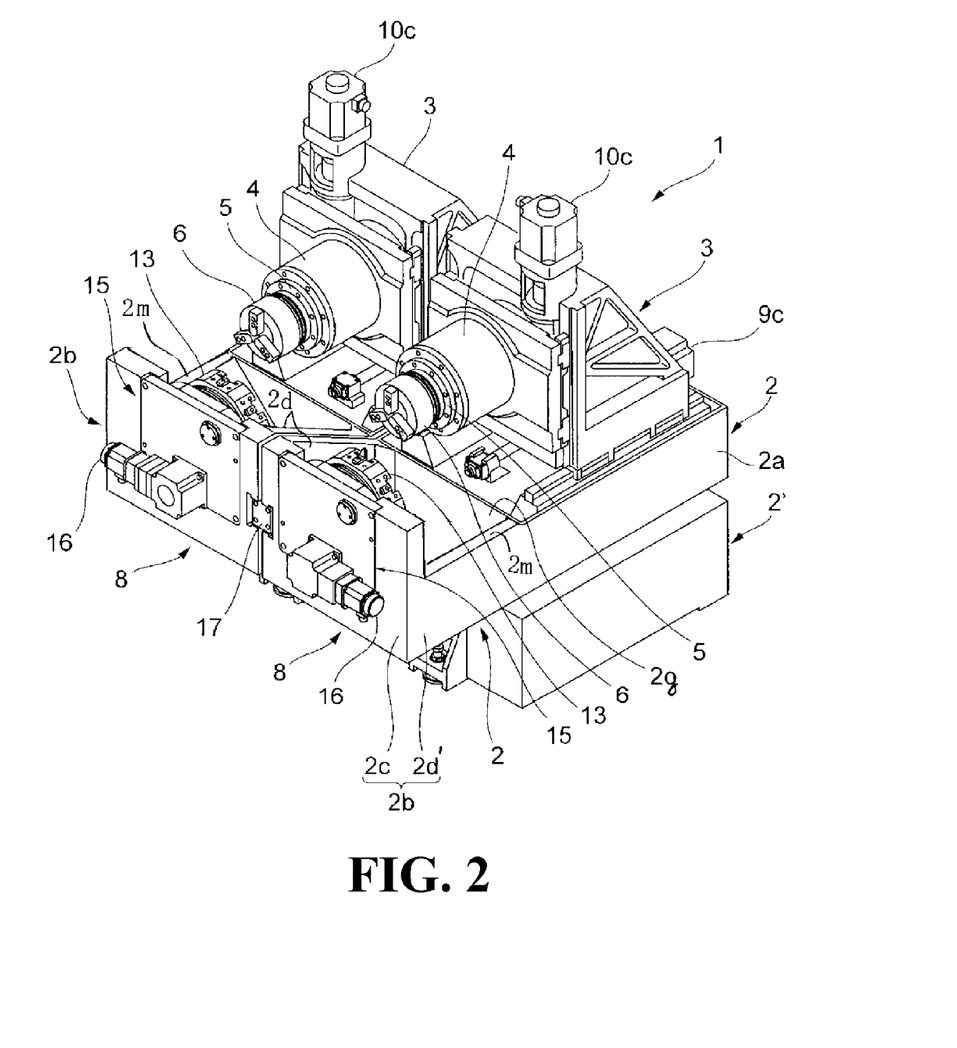
FIG. 2 is a perspective view of the lathe as seen from a front right upper side of the lathe.

In the drawings, the reference numeral "1" denotes a type of lathe having spindles facing the operator M side as a machine tool according to the present invention. This lathe 1 is provided with a pair of right and left beds 2 and 2, columns 3 and 3 each arranged movably in a front and back direction (Z-axis direction) on a base section 2a of each of the beds 2 and 2, spindle heads 4 and 4 movably supported on the front face of each column 3 in the up and down direction (Y-axis direction), and tool mounts 8 arranged on the operator M side. The pair of beds 2 and 2 are mounted on a common bed 2'. In the lathe 1 of this Embodiment, the boundary line between the beds 2 and 2 corresponds to a center of the machine in the width direction thereof.

Each column 3 is movably mounted on guide rails 9a and 9a fixed on the base section 2a via sliders 9b and 9b so as to be movable in the Z-axis direction by rotatably driving a ball screw, which is not illustrated, with a Z-axis feeding motor 9c.

In the same manner, each of the spindle heads 4 is movably supported by the guide rails 10a and 10a fixed to the front face of the column 3 via sliders 10b and 10b so as to be movable in the Y-axis direction by rotatably driving the ball screw, which is not illustrated, with a Y-axis feeding motor 10c.

In each of the spindle heads 4 and 4, a spindle 5 is arranged rotatably with its axis arranged horizontally. At the tip end part of the spindle 5 projected from the spindle head 4, a chuck (workpiece gripping portion) 6 for gripping a workpiece W is mounted facing the operator M side. The reference numeral "11" denotes a workpiece import and export mechanism. This mechanism is configured, for example, to supply an unprocessed workpiece W to the chuck 6 of the left side spindle 5, supply the processed workpiece by removing from the chuck 6 to the chuck 6 of the right side spindle 5, and then carry the workpiece W from the chuck 6 to the outside of the machine 1.

Each of the beds 2 and 2 is equipped with a tool mount installation portion 2b protruded from the base section 2a to the operator M side in an overhung manner, and the left and right tool mount installation portions 2b and 2b are joined via a connection bracket 17 arranged across the width center of the machine 1.

Each of the tool mount installation portion 2b is equipped with a vertical wall 2c vertically arranged in an open space below the spindle 5 and on the operator M side, and an inside wall 2d and an outside wall 2d' connecting the vertical wall 2c and the base section 2a. The outside wall 2d' is provided with a notch 2m for facilitating an operation of mounting and removing a chip shooter 21, which will be described later. The tool mount installation portion 2b is formed into a rectangular shape in a plan view, and the rectangle shaped part functions as a shooter mounting portion 2g.

Figure 3:
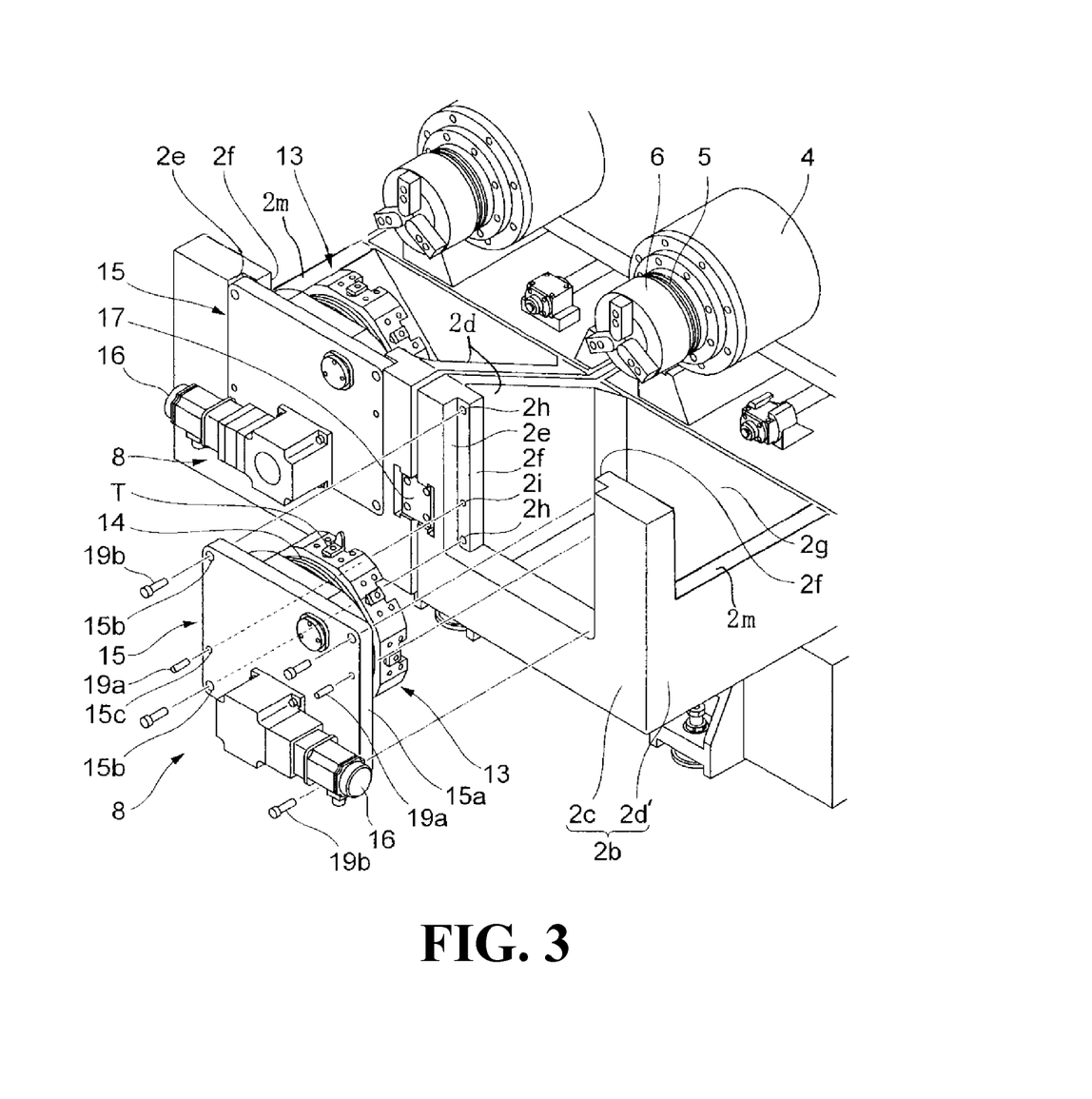
FIG. 3 is a partially exploded perspective view for explaining an assembling work for assembling a tool mount to a tool mount installation portion of the lathe.

In the vertical wall 2c of the tool mount installation portion 2b, a concave portion 2e is formed to detachably attach the tool mount 8. The concave portion 2e is opened upward. On the vertical side portions thereof, left and right supporting flange parts 2f and 2f are formed so as to form an elongated projection protruded inward of the concave portion 2e. Further, in each of the supporting flange parts 2f and 2f, screw holes 2h and 2h and a positioning hole 2i are formed.

The tool mount 8 is provided with a disc-shaped turret (rotary member) 13 equipped with a plurality of edged tools T on the outer peripheral surface thereof, an indexing mechanism 14 rotatably supporting the turret 13 about an axis parallel to an axis of the spindle 5 in an indexable manner, a supporting plate 15 for supporting the indexing mechanism 14, and an indexing motor 16 mounted on the supporting plate 15 to rotatably drive the indexing mechanism 14.

The supporting plate 15 is a rectangular shaped plate having rectangular shaped attaching flange parts 15a and 15a engaged with the concave portions 2e and 2e. At the portions of the attaching flange parts 15a corresponding to the screw holes 2h and 2h and the positioning hole 2i on the concave portion 2e side, bolt holes 15b and 15b and a positioning hole 15c are formed in a penetrated manner.

The tool mount 8 is fixed to the vertical wall 2c of the tool mount installation portion 2b by bolts 19b and 19b in a state in which positioning pins 19a and 19a preliminary press-fitted in the positioning holes 2i and 2i are aligned with the positioning holes 15c and 15c.

The lathe 1 of this Embodiment is provided with a chip discharging device 7 for discharging chips generated by turning processing of the workpiece W. The chip discharging device 7 includes a machine internal cover 20 arranged so as to enclose a processing point of the workpiece W processed by the tool T, the chip shooter 21 arranged in each shooter mounting portion 2g of each bed 2, and a chip collecting box 22 as a chip discharging member arranged below the chip shooter 21.

Here, the left and right shooter mounting portions 2g and 2g are laterally symmetric with respect to the center line of the machine 1, and each of the chip shooters 21 and 21 arranged in the laterally symmetric shooter mounting portions 2g and 2g is also laterally symmetric with respect to the widthwise center of the machine 1.

The chip shooter 21 is an integrally formed resin member having a so-called rounded shape. The chip shooter 21 includes an introducing opening 21a through which falling generated chips are introduced, and a discharging opening 21b smaller in diameter than the introducing opening 21a and configured to discharge the fallen and introduced chips toward the chip collecting box 22. The chip shooter 21 also includes a guide wall surface integrally formed by a plurality of wall surfaces, which will be described below, so as to connect the discharging opening 21b and the introducing opening 21a.

Figure 4:
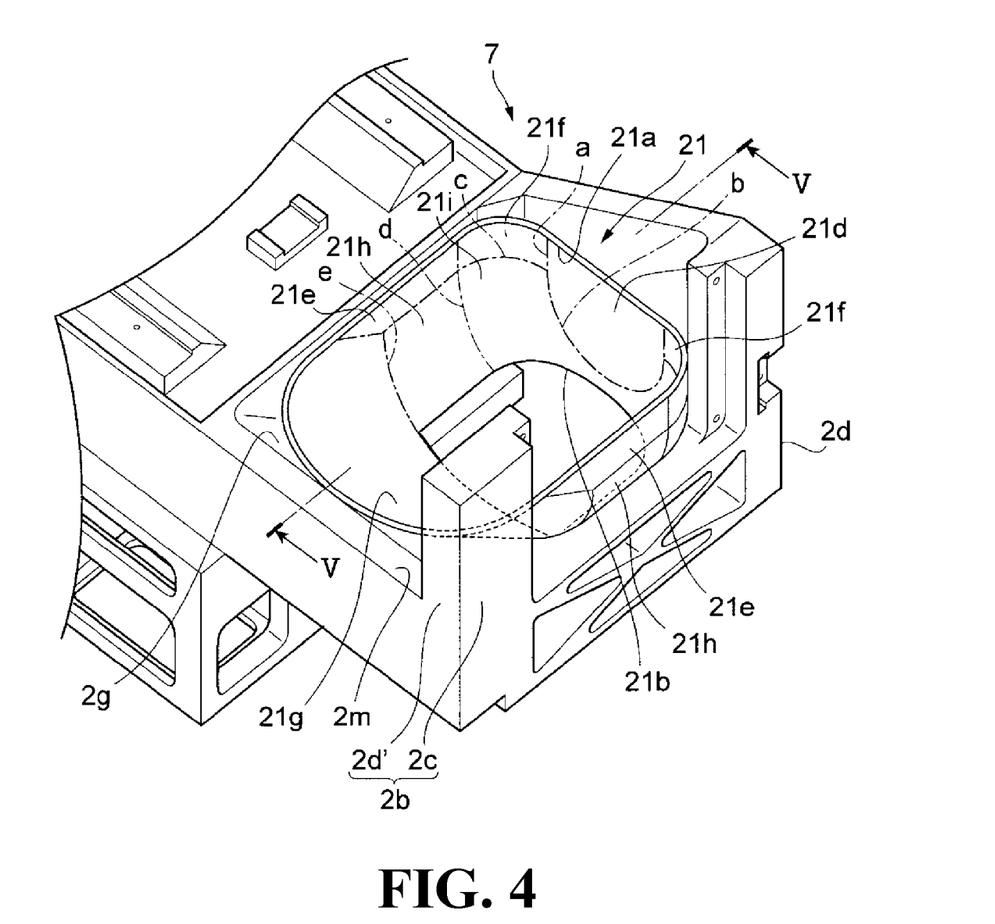
FIG. 4 is a perspective view showing a state in which a chip shooter is mounted in a left shooter mounting portion of a left bed.

The guide wall surface includes, as shown in FIG. 4, vertical wall surfaces 21d, 21e, and 21f extending in a vertical direction, and inclined wall surfaces 21g, 21h, and 21i inclined with respect to the vertical wall surfaces toward the discharging opening 21b which is smaller in diameter than the introducing opening 21a. All of the boundary parts of the wall surfaces where the vertical wall surfaces 21d to 21f and the inclined wall surfaces 21g to 21i are adjacent to each other are formed by a flat surface or a curved surface. Here, specifically, the phrase "boundary parts" means, for example, a boundary part "a" between the vertical wall surface 21d and the vertical wall surface 21f, a boundary part "b" between the vertical wall surface 21d and the inclined wall surface 21i, a boundary part "c" between the inclined wall surface 21i and the vertical wall surface 21f, a boundary part "d" between the inclined wall surface 21i and the inclined wall surface 21h, a boundary part "e" between the inclined wall surface 21h and the inclined wall surface 21g, etc. All of these boundary parts "a" to "e" are formed by a flat surface or a curved surface. That is, in this Embodiment, the boundary parts between any of the wall surfaces are smoothly formed as a continuous surface which does not form a corner part or an angular bent part.

Figure 5:
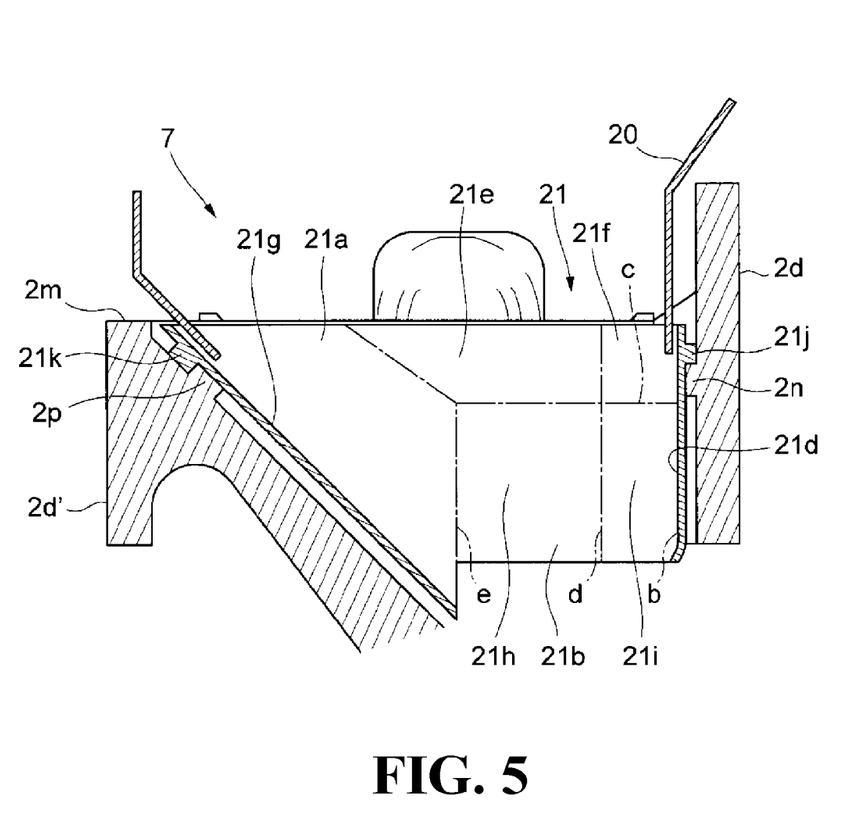
FIG. 5 is a cross-sectional view taken along the line V-V in FIG. 4 showing the chip shooter mounted in the shooter mounting portion of the bed.
Figure 6:
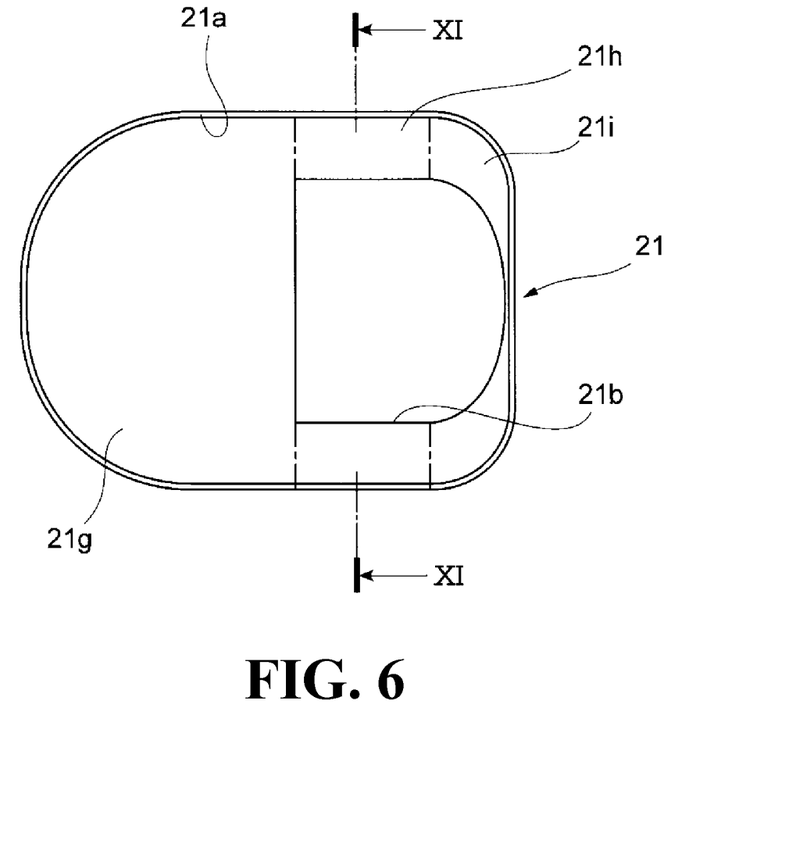
FIG. 6 is a plan view of the chip shooter.
Figure 7:
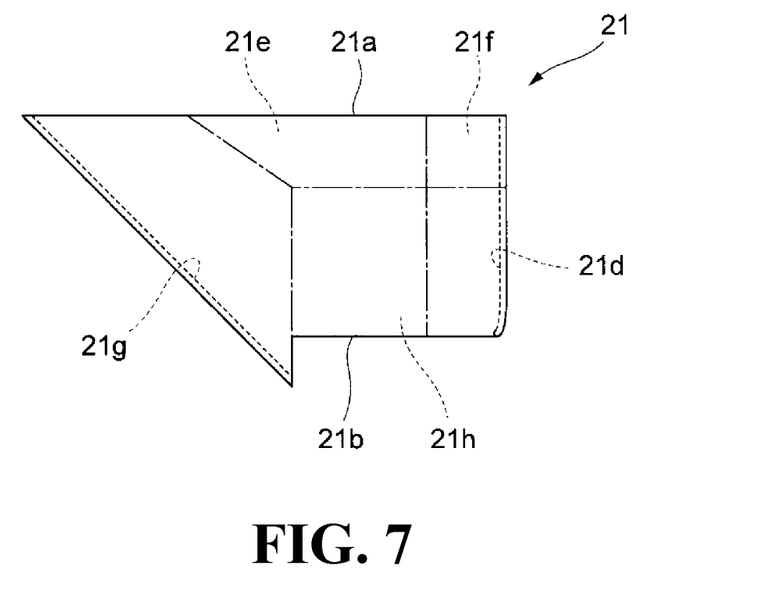
FIG. 7 is a side view of the chip shooter.
Figure 8:
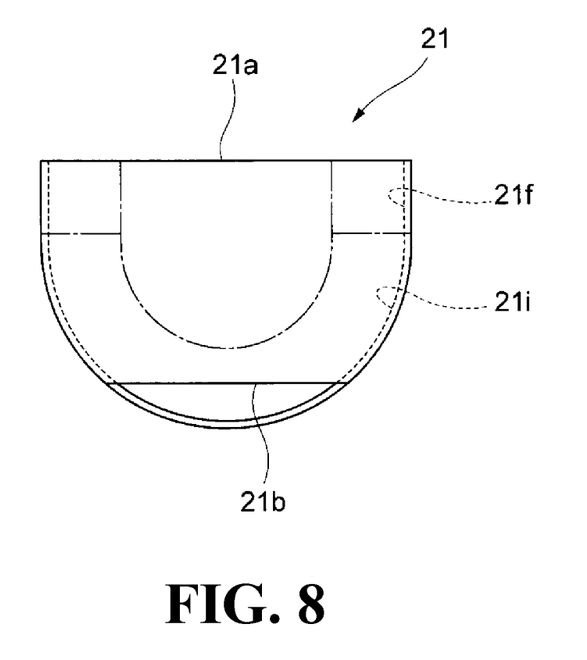
FIG. 8 is a top view of the chip shooter.
Figure 9:
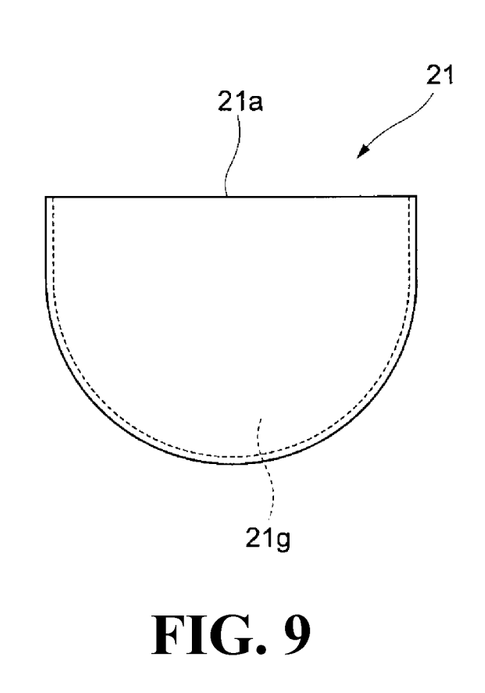
FIG. 9 is a front view of the chip shooter.
Figure 10:
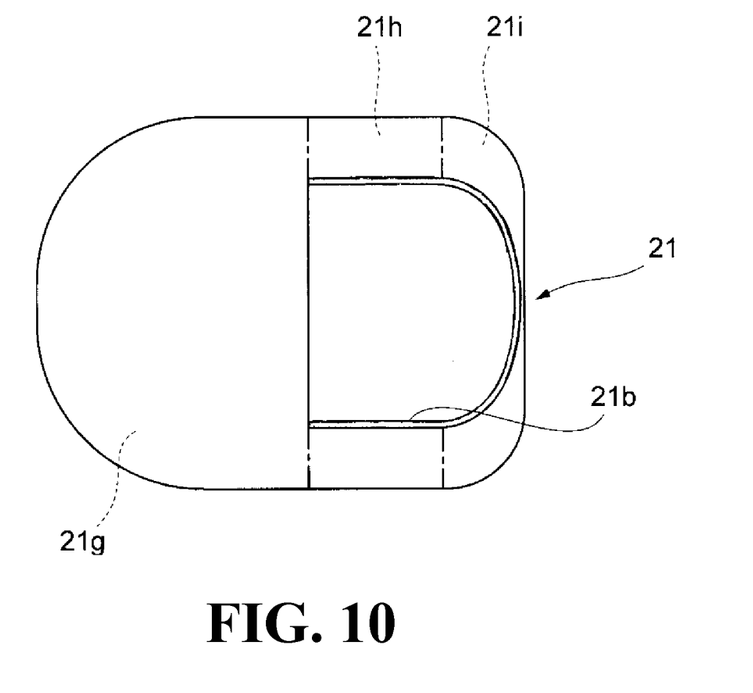
FIG. 10 is a bottom view of the chip shooter.
Figure 11:
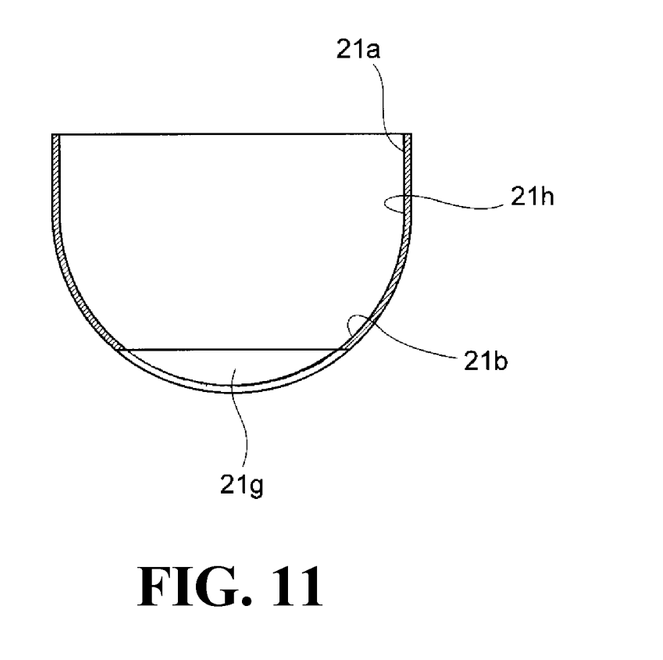
FIG. 11 is a cross-sectional view of the chip shooter taken along the line XI-XI in FIG. 6.

The left and right chip shooters 21 of this Embodiment are respectively mounted in the left and right shooter mounting portions 2g and 2g each formed below the workpiece processing part in each of the beds 2 and 2 by being inserted in a direction from the left and right sides of the beds 2 and 2 toward the center side of the machine 1 through the corresponding notches 2m and 2m, and are fixed in the left and right shooter mounting portions 2g and 2g. More specifically, a plural pairs of locking seats 2p are provided on the inner surface of the outside wall surface 2d' of the shooter mounting portion 2g of the bed 2, and a plural pairs of locking seats 2n are provided on the inner surface of the inside wall surface 2d. Further, plural pairs of locking pieces 21j are provided on the outer surface of the vertical wall surface 21d of the chip shooter 21, and plural pairs of locking pieces 21k are provided on the outer surface of the inclined wall surface 21g. The chip shooter 21 is mounted in the shooter mounting portion 2g by engaging the locking pieces 21j and 21k of the outer surface of the chip shooter 21 with the locking seat 2n and 2p by the own weight of the chip shooter 21.

According to this Embodiment, the chips generated by the cutting processing of the workpiece W by the tool T are guided by the machine internal guide 20, and the chips are fallen and introduced into the chip shooter 21 through the introducing opening 21a of the chip shooter 21. The chips are guided to the discharging opening 21b by the guide wall surface and fallen and discharged below. In this case, the guide wall surface of this Embodiment is formed by the plurality of vertical wall surfaces 21d to 21f and the plurality of inclined wall surfaces 21g to 21i. However, all of the boundary parts "a" to "e" of the adjacent wall surfaces are formed by a flat surface or a curved surface, and a corner part or an angular bent part is not existed. Therefore, the chips will be smoothly fallen and discharged without being got stuck with the guide wall surface.

According to this Embodiment, all of the boundary parts of the vertical wall surfaces 21d to 21f and the inclined wall surfaces 21g to 21i forming the guide wall surface of the chip shooter 21 are formed by a flat surface or a curved surface. That is, the wall surfaces do not form a corner part or an angular bent part where the chips are readily got stuck, which can avoid a problem that chips are got stuck in a corner part or a bent part of the wall surfaces. Further, the boundary parts of the vertical wall surfaces are also formed by a flat surface or a curved surface, and therefore the accumulation of the chips can be assuredly avoided.

Further, in this Embodiment, the shooter mounting portion 2g is formed below the workpiece processing part in the bed 2, and the chip shooter 21 is inserted from the outside of the bed 2 toward the center side of the machine through the notch 2m and arranged in the shooter mounting portion 2g. Therefore, even in the case where the tool mount 8 is arranged on the operator M side of the bed 2, the mounting and removing operations of the chip shooter 21 can be facilitated.

Furthermore, the locking seats 2p and 2n are respectively formed on the outer and inner side walls 2d' and 2d of the shooter mounting portion 2g of the bed 2. The locking pieces 21k and 21j are respectively formed on the inclined wall surface 21g which is an outer side surface and the vertical wall surface 21d which is an inner side surface. The chip shooter 21 is arranged in the shooter mounting portion 2g by engaging the locking pieces 21k and 21j with the locking seats 2p and 2n using the own weight of the chip shooter 21. This further facilitates the mounting and removing operations of the chip shooter 21.

Further, in this Embodiment, the chip shooter 21 is mounted in the shooter mounting portion 2g as described above. Therefore, when inserting the tool mount 8 in the concave portion 2e formed in the tool mount installation portion 2b provided on the operator M side, the chip shooter 21 does not interfere with the mounting and removing operation of the chip shooter 21.

Further, in the left and right shooter mounting portions 2g and 2g, the left and right chip shooters 21 and 21 symmetric with respect to the center of the machine 1 are respectively inserted from the left and right sides of the machine 1 and fixed. This makes it possible to employ the same shaped chip shooters 21 and 21 for the right chip shooter and the left chip shooter by inserting the chip shooters from the right side or left side of the machine 1 in a manner such that the chip shooters 21 and 21 are rotated by 180 degrees so as to be opposed each other. Therefore, the cost of a mold can be reduced when forming the chip shooters by molding.

In the aforementioned Embodiment, all of the connecting parts of the vertical wall surfaces and the inclined wall surfaces are formed by a flat surface or a curved surface. However, in the present invention, it is not always required to form the connecting parts of the vertical wall surfaces by a flat surface or a curved surface. The connecting parts of the vertical wall surfaces can be formed by a corner part or an angular bent part. The corner part or the angular bent part formed by such vertical wall surfaces extends in the vertical direction, and therefore it is considered that chips are readily fallen by its own weight even a corner or an angular bent part is formed and that not so many chips are accumulated.

Further, in the aforementioned Embodiment, the explanation is directed to the case in which a chip discharging member is a chip collecting box 22. However, the chip discharging member of the present invention can be, for example, a chip conveyer for discharging chips to the outside of the machine 1 by a conveyer.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A chip discharging device of a machine tool, comprising:
a chip discharging member configured to discharge chips generated by machine processing of a workpiece at a processing point to an outside of the machine tool; and
a chip shooter configured to introduce the chips to the chip discharging member,
wherein the chip shooter includes an introducing opening for introducing the generated chips, a discharging opening for discharging the chips toward the chip discharging member, and a guide wall surface connecting the introducing opening and the discharging opening,
wherein the guide wall surface includes first and second vertical wall surfaces extending in a vertical direction and first and second inclined wall surfaces inclined with respect to the vertical direction,
wherein the first and second vertical wall surfaces are connected to the introducing opening,
wherein the first and second inclined wall surfaces are continuously configured to the first and second vertical wall surfaces, and are connected to the discharging opening,
wherein a boundary part between the first and second inclined wall surfaces, and a boundary part between the first inclined wall surface and the first vertical wall surface are formed by a flat surface or a curved surface, and
wherein the first and second vertical wall surfaces are configured closer to the processing point than the first and second inclined wall surfaces to the processing point.

2. The chip discharging device of the machine tool as recited in claim 1, further comprising a shooter mounting portion formed in a bed of the machine tool, the shooter mounting portion being configured to mount the chip shooter below a workpiece processing part,
wherein the chip shooter is mounted in the shooter mounting portion by inserting from an outside of the bed toward a center side of the machine, and is fixed in the shooter mounting portion.

3. The chip discharging device as recited in claim 2, wherein the shooter mounting portion of the bed is provided with a locking seat, and the chip shooter is provided with a locking piece formed on an outer surface of the chip shooter, and
wherein the chip shooter is mounted in the shooter mounting portion by engaging the locking piece with the locking seat.

4. The chip discharging device of the machine tool as recited in claim 2,
wherein the machine tool includes workpiece processing parts arranged on left and right sides with respect to a center of the machine, and left and right shooter mounting portions arranged below each of the workpiece processing parts, and
wherein the chip shooter is structured so as to be mounted in either of the left and right shooter mounting portions.

5. A machine tool comprising:
a chip discharging member configured to discharge chips generated by machine processing of a workpiece at a processing point to an outside of the machine tool; and
a chip shooter configured to introduce the chips to the chip discharging member,
wherein the chip shooter includes an introducing opening for introducing the generated chips, a discharging opening for discharging the chips toward the chip discharging member, and a guide wall surface connecting the introducing opening and the discharging opening,
wherein the guide wall surface includes first and second vertical wall surfaces extending in a vertical direction and first and second inclined wall surfaces inclined with respect to the vertical direction, and
wherein a boundary part between the first and second inclined wall surfaces, and a boundary part between the first inclined wall surface and the first vertical wall surface are formed by a flat surface or a curved surface.

6. The machine tool as recited in claim 5, further comprising a shooter mounting portion formed in a bed of the machine tool, the shooter mounting portion being configured to mount the chip shooter below a workpiece processing part,
wherein the chip shooter is mounted in the shooter mounting portion by inserting from an outside of the bed toward a center side of the machine, and is fixed in the shooter mounting portion.

7. The chip discharging device as recited in claim 6, wherein the shooter mounting portion of the bed is provided with a locking seat, and the chip shooter is provided with a locking piece formed on an outer surface of the chip shooter, and
wherein the chip shooter is mounted in the shooter mounting portion by engaging the locking piece with the locking seat.

8. The machine tool as recited in claim 6, further comprising workpiece processing parts arranged on left and right sides with respect to a width center of the machine, and left and right shooter mounting portions arranged below each of the workpiece processing parts, and
wherein the chip shooter is structured so as to be mounted in either of the left and right shooter mounting portions.

9. The machine tool as recited in claim 1, wherein
a space of the chip shooter, through which the chips are transferred to be discharged, at the first and second vertical wall surfaces is larger than a space of the chip shooter at the first and second inclined wall surfaces.

10. A chip discharging device of a machine tool, comprising:
a chip discharging member configured to discharge chips generated by machine processing of a workpiece to an outside of the machine tool;
a chip shooter configured to introduce the chips to the chip discharging member; and
a shooter mounting portion formed in a bed of the machine tool, the shooter mounting portion being configured to mount the chip shooter below a workpiece processing part,
wherein the chip shooter includes an introducing opening for introducing the generated chips, a discharging opening for discharging the chips toward the chip discharging member, and a guide wall surface connecting the introducing opening and the discharging opening, where the guide wall surface includes a vertical wall surface and a plurality of inclined wall surfaces inclined with respect to the vertical wall surface, and wherein at least a boundary part between the inclined wall surfaces and a boundary part between the inclined wall surface and the vertical wall surface are formed by a flat surface or a curved surface, wherein the shooter mounting portion of the bed is provided with a locking seat, and the chip shooter is provided with a locking piece formed on an outer surface of the chip shooter, and wherein the chip shooter is mounted in the shooter mounting portion by engaging the locking piece with the locking seat.

* * * * *